United States Patent

[11] 3,553,430

| [72] | Inventor | Lawrence K. M. Ting |
| | | Arlington, Mass. |
| [21] | Appl. No. | 751,462 |
| [22] | Filed | Aug. 9, 1968 |
| [45] | Patented | Jan. 5, 1971 |
| [73] | Assignee | Polaroid Corporation |
| | | Cambridge, Mass. |
| | | a corporation of Delaware |

[54] CONTROL SYSTEM AND APPARATUS FOR A HEATING STATION
20 Claims, 4 Drawing Figs.

| [52] | U.S. Cl. | 219/501, 219/505 |
| [51] | Int. Cl. | H05b 1/02 |
| [50] | Field of Search | 219/501, 505, 504 |

[56] References Cited
UNITED STATES PATENTS

| 3,161,759 | 12/1964 | Gambill et al. | 219/501 |
| 3,149,224 | 9/1964 | Horne et al. | 219/501 |
| 3,456,096 | 7/1969 | Bilbro | 219/501 |

Primary Examiner—Bernard A. Gilheany
Assistant Examiner—F. E. Bell
Attorneys—Brown and Mikulka, William D. Roberson and Gerald L. Smith ABSTRACT: A control system for regulating the power input to the heating station of a processing device. The system utilizes a gated, full-wave thyristor to regulate an AC power input to an electrical heating element. Using a thermistor as a temperature sensor, the control system functions to periodically sample heating station temperature at the commencement of each input power supply cycle. A signal threshold level is established within the sampling interval, below which full-power will be inserted through the thyristor.

CONTROL SYSTEM AND APPARATUS FOR A HEATING STATION

BACKGROUND OF THE INVENTION

A variety of sophisticated materials processing systems have been proposed by industry which require as a repetitive processing step, a regulated heat input over a relatively short time interval. To provide this thermal input, it is usually convenient to insert within the systems electric heating elements the current through which is controlled in response to the measured temperature of a heated environment. As the processing systems have become more specialized and intricate, the performance criteria imposed upon such heating elements and their related control functions correspondingly have become more difficult to meet. Design parameters frequently encountered in this field include, inter alia, such requirements as repeated high speed accelerated heat-up to a target temperature or temperature profile; accurate maintenance of predetermined temperature levels once they are initially achieved; maintenance of these target temperatures under widely varying line voltage power inputs; rapid accommodation to heat drain or quenching imposed by the system processes; and, where high volume relatively low cost production is contemplated, the control devices should incorporate standard sensing elements in conjunction with relatively simple circuit designs.

Two techniques are generally employed for regulating current input into heating elements. In one arrangement, a thermostat control switches current on when the temperature of the heated environment drops to a given point. The thermostatic device functions to turn current off again when the temperature rises above a preselected level. For applications where target temperature levels are critical, this form of control will usually derive unwanted temperature excursions alternately above and below the critical level. Such temperature deviation is induced as a result of a thermal inertia within the object being heated. Typically, when current to the heating element is cut off, the temperature within the object continues to rise, and conversely, the temperature continues to fall for a finite period after current is turned on.

A second regulating technique, generally referred to as a servocontrol, functions to vary the current input to the heating element in accordance with the amount by which the temperature of the heated object differs from a target temperature level value. As the temperature of the heated environment approaches this value, the servoregulated input current to the heating element is gradually diminished until target level is attained. Conversely, as the temperature of the heated environment departs from target level, the servoregulated current to the heating element is gradually increased. Generally, the continuously variable current control function of the servodevices has been provided by regulation of semiconductive full-wave AC control devices inserted in series with the heating element. This regulation is derived from sensing elements which have electrical characteristics varying with the temperature of their environment. Typically, thermistors having resistances which vary with temperature are used for this purpose. Control circuitries incorporating such sensing elements are often typified as rather elaborate networks having correspondingly elevated production costs.

For process heating station applications requiring a highly repetitive and very rapid heat-up to a target temperature while additionally requiring a maintenance of that target temperature level under heavy heat dumping loads, conventional servoregulating schemes have been found inadequately responsive. The maintenance of these target levels also is affected adversely by line voltage variations.

The relatively slow responsiveness of conventional temperature control systems stems primarily from the output signal characteristics of their sensing elements. To be adequately responsive, the elements must have a characteristic whose signal output varies sharply within a narrow range encompassing a select target temperature. Conventional sensing elements such as thermistors, fail to provide this characteristic. For instance, negative temperature coefficient (NTC) thermistors are identified in having resistance vs. temperature characteristic curves, the steeper slopes of which occur at temperature ranges too low and resistance ranges too high and impractical for most process heating station applications. Within practical temperature ranges, the relatively low slope of their characteristic curves renders the sensing elements inadequately sensitive for deriving necessary rapid control response rates. To recover from a sudden temperature drop, the heating element within the heating stations should receive all power available from a line input source. To provide this function, control systems must be capable of inserting substantially full line power to heating elements very quickly. The gradual control generally available from using conventional sensing elements is not sufficient to provide adequate recovery following a processing step at the heating stations or at the outset at a heat dumping or quenching. Typically, a temperature excursion amounting to about 100° F. is required when sensing with conventional thermistors to evolve a control system reaction which functions to insert all power available from a line source.

Positive temperature control (PTC) thermistors while having a resistance—temperature characteristic curves evidencing a somewhat steep slope at practical temperature ranges, also produce excessive resistance within these ranges. As a consequence, they are not acceptable for control purposes without complementary gain control systems of impractical and unacceptable cost.

SUMMARY OF THE INVENTION

The invention now presented provides a temperature control system which functions to maintain an electric heating element or its heated environment at preselected target temperature levels. The control system features a high sensitivity and is capable of providing a resultant rapid rate of corrective response to quenching or heat drains which may be encountered within the temperature controlled environment of a heating station. In addition to providing an accurate and consistent temperature level control while retaining a high temperature sensitivity, the system is characterized by its capability for achieving target temperature levels within short heat-up time intervals.

The inventive system functions to provide accurately controlled full-line power insertion to a process heating station in response to relatively minor deviations from a target temperature. This highly responsive control is achieved using conventional temperature sensing devices. These conventional sensing devices are utilized within their most desirable relatively low ohmic ranges of operation and without additional amplification or gain implementation.

This advantageous feature of the invention is derived by virtue of a periodic temperature sampling effected by the control system at the commencement of each input power supply cycle. By establishing a signal threshold level preferably within the interval of sampling, the system is made capable of inserting the full capacity of its power supply upon witnessing a small deviation from a preselected target temperature. Within a relatively small temperature range below such target level, the system functions to provide highly accurate, proportional control over input power. Should temperature excursions be encountered above the preselected target level, the system functions to rapidly terminate all power input to its heating element.

The invention provides further advantage through the use of periodic sampling signals in conjunction with temperature sensing elements of the nonlinear sensors of the thermistor variety. As a result of their periodic utilization over brief intervals, the elements are not subjected to deteriorating self-heating effects.

By virtue of its unique mode of control, the system of the invention is ideally suited for functioning in anticipation of heat dumping or quenching loads introduced into a process heating station. Because of the advantageous substantially full-power insertion aspects of the control circuitry of the invention, line voltage variations which may occur during a process operation have only a nominal effect upon the thermal response of a heating station which the system controls.

An important application to which the present temperature control system is addressed lies in the document copying field. The application contemplating its use provides a drying station through which dampened photosensitive sheets are passed. This station utilizes a low mass heating element powered by an AC source. By virtue of the present invention, the heating element of the station may be brought to a critical target level temperature repeatedly and within an abbreviated time interval. As the moistened photographic sheet material is passed through the drying station, the control system of the invention rapidly accommodates a resultant heat dumping within the station. This thermal accommodation is provided through a swift insertion of full power into the drying station following only a minor drop in temperature. As a result of this full-power insertion, the dryer is capable of operating at acceptable speeds. For instance, dryers typically must process moistened documents at speeds of about 3 inches per second. To achieve this speed of drying while using the limited power outputs of conventional line sources, full power is inserted at the earliest process opportunity.

Another object of the invention is to provide a system for controlling the thermal output of an electrical heating station which combines a gated switching means responsive to an enabling signal of predetermined threshold level. This enabling signal is arranged so as to be alterable in response to the variable electrical characteristic of temperature sensor.

The invention is further characterized by its advantageously simple design and structure. As a result, the control system lends itself to relatively inexpensive fabrication techniques while maintaining desirable reliabilities.

Other objects of the invention will in part be obvious and will in part appear hereinafter.

The invention accordingly comprises the features of construction, combination of elements and arrangement of parts which will be exemplified in the construction hereinafter set forth.

For a fuller understanding of the nature and objects of the invention, reference should be had to the following detailed description taken in connection with the accompanying drawings.

DETAILED DESCRIPTION OF THE DRAWINGS

Temperature control systems designed in accordance with the present invention advantageously function to achieve target level temperatures within the heated environment of a processing station with not only accuracy but also considerable rapidity. The desirability of these features becomes particularly apparent when the system is incorporated within the drying station of a photocopying device as is described in a copending application for patent entitled, "Paper Transport System," under the inventorship of Richard J. Chen, Nicholas Gold and Paul B. Mason, Ser. No. 722,853 filed Apr. 22, 1968, and assigned in common herewith, now U.S. Pat. No. 3,536,401. Such photocopying machines generally function to expose a photosensitized sheet of paper at a first station. This exposed sheet is then passed within a conveyor system into a imbibition station at which position it is wetted with a liquid developing agent. From the imbibition station, the conveyor system passes the wetted and now image-carrying sheet through a dryer station. At the dryer station, excess moisture is removed from the sheets and a completed, usable copy is available following its egress therefrom.

To remain practical and appropriately competitive, the exposed sheets must be moved through the various stations of the copy machine with reasonable rapidity. For example, the drying station may typically be reached by the exposed paper sheets within about 9 seconds from machine startup. Similarly, the drying station must be capable of removing moisture from the sheets as they are passed therethrough at a velocity of about 3 inches per second.

This rapid manipulation initially requires that the dryer station achieve an appropriate drying temperature level within such a 9 second warmup interval. Further, the maximum temperature levels required for this moisture removing process must be closely adhered to. It will be apparent that the quality of the paper or the chemically derived image upon its surface will be adversely affected by an excessive thermal input.

As moistened image-carrying sheets are moved through the dryer station, there is created a somewhat abrupt heat drain, which, without further adjustment, will engender a considerable temperature drop across the heating unit. In most electric heating systems, a correction for this quenching action is supplied by a higher power contribution. For the instant purposes, this power must be inserted quickly in order to maintain a thermal energy condition adequate for removing all moisture.

Figure 1:
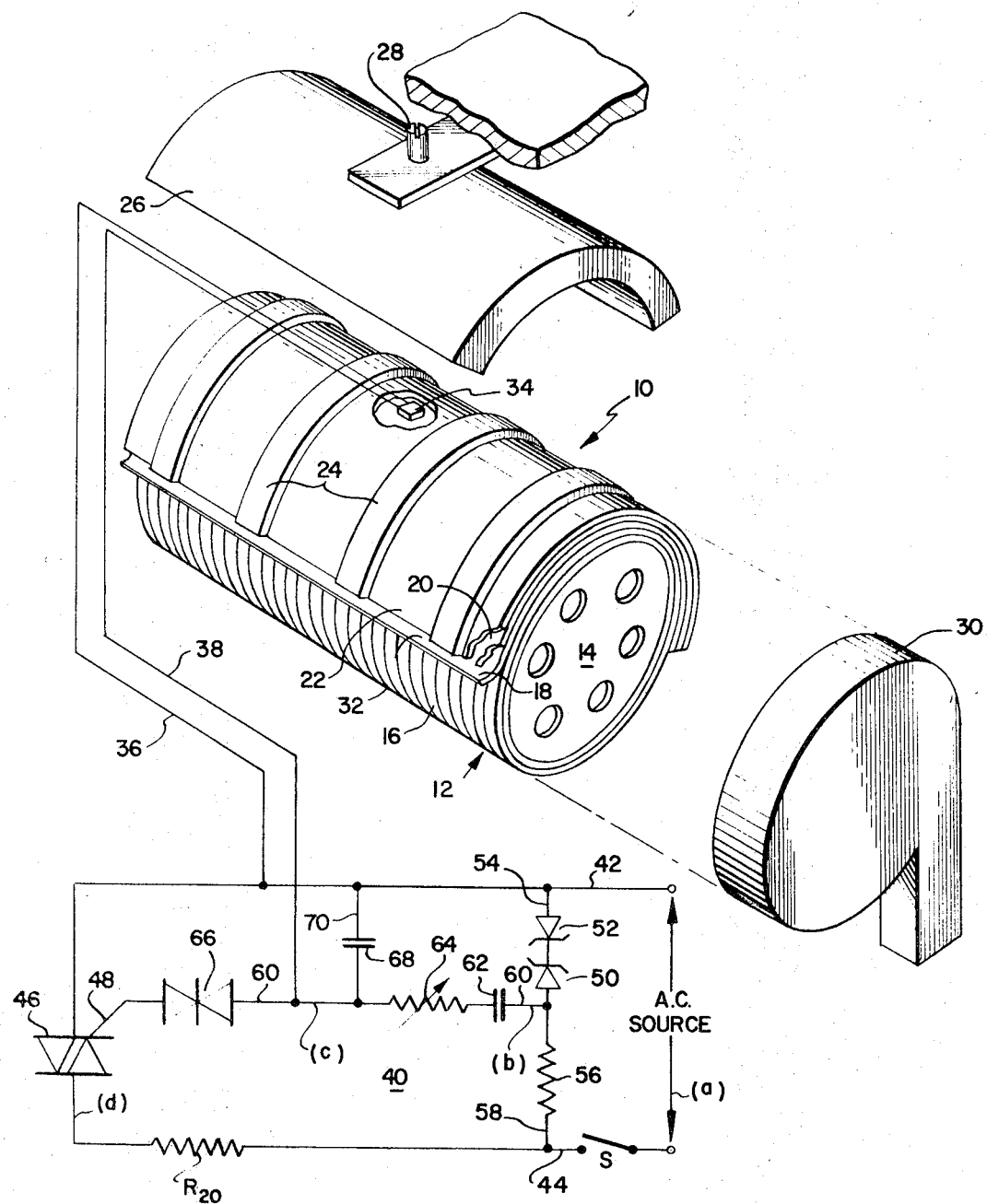
FIG. 1 is a partially pictorial and a partially schematic diagram of the temperature control system of the invention incorporated with the dryer station of a document copier machine.

Referring to FIG. 1, an exemplary dryer station which may utilize the control system of the invention is illustrated generally at 10. Dryer station 10 is formed of a perforated hollow cylindrical member 12 which is rotatable about its longitudinal axis by driving means not shown. The ends of the member 12 are provided with end plates 14, each of which is apertured to allow for the passage of exhausted air through the interior of the cylinder. A layer of porous, compliant material, the outer periphery of which is wound with a pile fabric 16 forms the longitudinal surface of the cylinder.

Mounted above and in slidable contact with cylindrical member 12 is a heater assembly. The heater assembly is formed having a platen 18 fashioned from stainless steel sheet. Upon platen 18 there is intimately connected sheet form low mass heating element 20 extending over the length of the cylinder. Heating element 20 is retained in position with an insulated asbestos layer 22 and a series of strap members 24. The platen 18 — heating element 20 assembly is urged against surface 16 of the cylinder by a pressure plate assembly 26. Adjustment of the pressure exerted by the assembly 26 is provided by a machine screw 28. A duct 30 is positioned against end plate 14 of the cylinder for purposes of receiving and carrying off a flow of air passing through the entire assembly.

Figure 2:
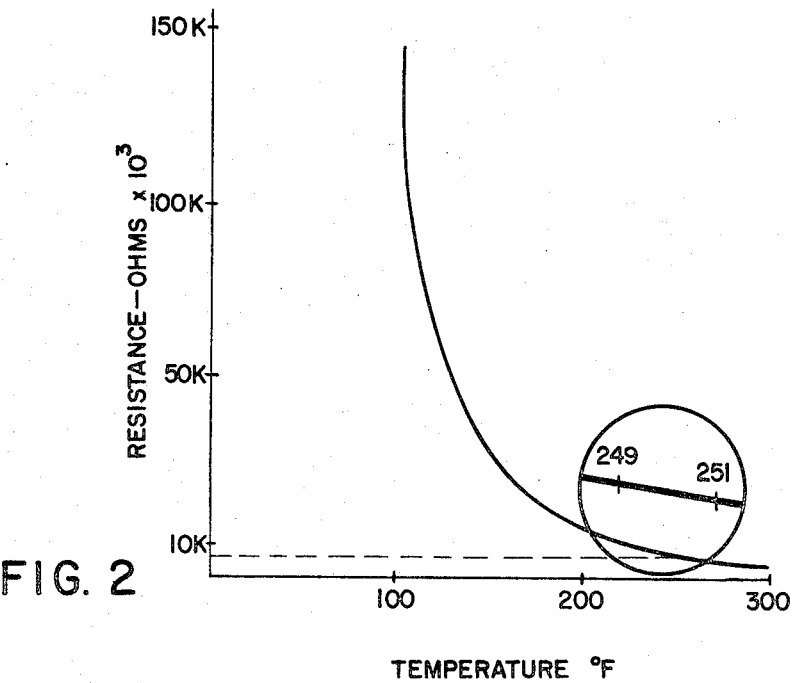
FIG. 2 is a resistance-temperature characteristic curve for a negative temperature coefficient thermistor which may be incorporated with the circuitry illustrated in FIG. 1.

In operation, the leading edges of dampened image-carrying photographic sheets are introduced into the dryer beneath a deflected lip portion 32 of platen 18. The cylinder 12 is caused to rotate in clockwise direction, thereby drawing the sheets between the pressurized interface of the assembly. As each photographic sheet passes through the arrangement it is heat dried by virtue of an AC current input through the resistive heating element 20. The temperature or temperature profile across the heating element is monitored by a sensing device 34 which is a thermistor, for instance, of the negative temperature coefficient (NTC) variety. This form of sensing element, when heated within certain limits, will assume a resistance which varies somewhat inversely with its temperature. A typical characteristic curve for the element is illustrated in FIG. 2. Positioning of the NTC thermistor 34 is a matter of design choice. The sensing device is shown in metallically bonded contact with heating element 20 at about its midpoint. Depending upon the thermal characteristic desired to be measured, the sensor 34 may be positioned at the leading or trailing edge of the element 20 and may be fixed to portions of the assembly other than the surface of the heating element itself. The thermally dependent resistances derived at the NTC thermistor 34 are used, ultimately, to control the power input into heating element 20. Connecting leads 36 and 28 provide for signal insertion from element 34 into the system control circuitry shown generally at 40.

Looking to circuitry 40, power is supplied to the low mass heating element 20, now identified as a resistor $R_{20}$, from a conventional AC power source having line inputs at 42 and 44. A switch S on line 44 functions, when closed, to energize the circuitry. The AC power input to heating element $R_{20}$ is directly controlled by a gated bidirectional thyristor 46. Commonly referred to as a "Triac," the thyristor 46 is a three terminal full-wave AC control device which is triggered into conduction at a gate 48. When incorporated within more conventional circuitries, the thyristor 46 functions to respond to a phase control signal inserted at its gate 48. This control signal is developed in response to temperature related signals evolved at the temperature sensing element 34. Such an arrangement, however, is not achieved without the additional provision of somewhat complex signal conditioning system. A thermistor which is selected for incorporation within control systems as now described should have a somewhat linear characteristic at about the midpoint of the temperature range which it is called upon to monitor. For operation with normal power sources, it additionally must have resistance characteristics which are sufficiently low such that gain devices and the like aren't required to derive signals of sufficient strength. For more desirable applications, temperature dependent resistance elements of this variety should operate within ranges of about 1,000-20,000 ohms. This ohmic range will cooperate ideally with easily obtained power inputs.

Examination of the typical characteristic curve for an NTC thermistor illustrated in FIG. 2 reveals that within ohmic ranges desired for the present application, the slope of the curve is relatively shallow. This shallow slope, of itself, represents a sensitivity lower than desired for highly responsive control applications. At the steeply sloping portions of the curve, the sensitivity of the element is desirably high, however, the ohmic range corresponding thereto is prohibitively high. The present control system utilizes the element at a temperature range corresponding with the lower slope portion of the curve, however, the system enjoys a high sensitivity. Shown as an enlarged scale insert in the drawing is that portion of the characteristic curve from which the temperature responsive signal of the present system is drawn. The extent of this selected temperature range is very small, amounting to about 2° F. In conventional document drying applications, an exemplary temperature range of operation may be from about 249° F. to 251° F. as indicated.

Returning to FIG. 1, the desirably high degree of system sensitivity will be seen to be derived from signals derived at thermistor 34 and inserted into the circuitry illustrated in general at 40. Upon closure of switch S, power is applied across lines 42 and 44. This source has a voltage waveform shown at (a) in FIG. 3. The AC signal is introduced to back-to-back oriented Zener diodes 50 and 52 on line 54. Diodes 50 and 52 are combined in series with a current limiting resistor 56 in line 58 to provide a clipping function deriving the waveform (b) depicted in FIG. 3. The resultant clipped signal form (b) is introduced to an AC coupling including a capacitor 62 on line 60 and a variable resistor 64. Capacitor 62 and resistor 64 and the resistance of thermistor 34 function to cause a form of differentiation of the clipped signal (b) thereby forming a waveform as illustrated at (c) in FIG. 3. The shape of pulse form (c) will vary somewhat in relation to the relative values of resistance and capacitance within this circuit. Pulse form (c) signal is introduced to a bilateral trigger 66. Trigger 66 is of the variety which conducts upon receipt of a selected forward breakover voltage. Upon receipt of a breakover voltage, the trigger functions to gate the thyristor 46, thereby permitting a phase controlled power input to the heating element $R_{20}$. To improve gating response at the gate 48 of thyristor 46, a capacitor 68 on line 70 is inserted in series with the AC coupling or differentiating arrangement on line 60. Capacitor 68 on line 70 functions to supply a buttressing current to the thyristor 46 at each firing of the bilateral trigger 66.

Figure 3:
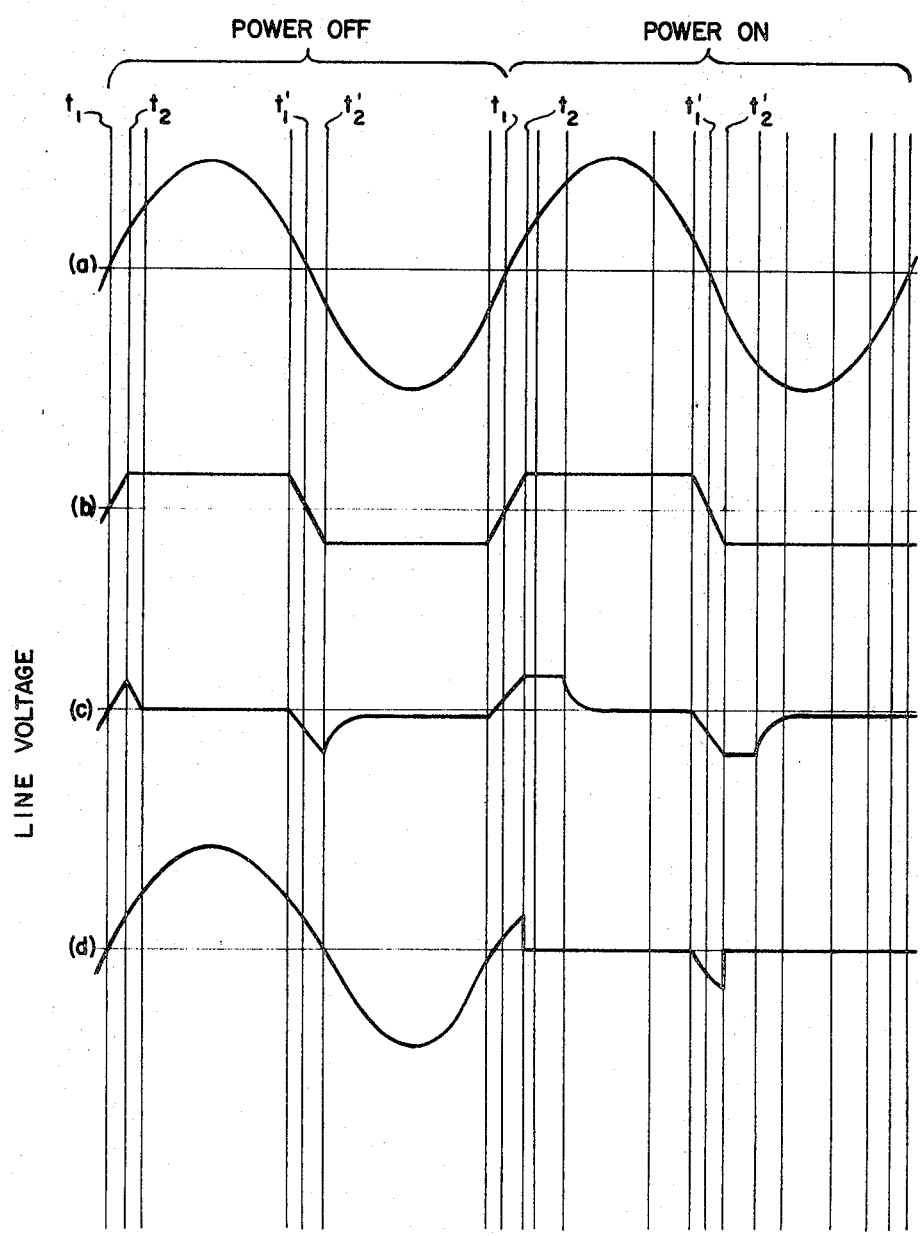
FIG. 3 is a waveform diagram showing voltage waveforms occurring at various points in the circuitry of FIG. 1.

Turning in more detail to FIG. 3, the operation of the circuit is portrayed by waveforms representing a full "power off" status at heating element $R_{20}$ in juxtaposition to a "power on" or power insertion status. A sinusoidal waveform evidencing about a 350 peak-to-peak voltage is provided as a power source for the system as depicted at (a). This source is tapped at lines 54 and 58 by a clipping circuit including diodes 50 and 52. The resultant clipped waveform of, for instance, 100 volts peak-to-peak is represented by waveform (b). Note that at the commencement of each half cycle there exists an interval $t_1$ to $t_2$ or $t'_1$ to $t'_2$ during which the voltage rises to its peak clipped amplitude. This peak voltage level is selected to correspond with the breakover voltage level required to trigger bilateral trigger 66 into conduction. As a consequence, the waveform (b) may be considered to represent a signal source which is operated upon by the temperature sensing elements of the circuit. Clipped waveform (b) assumes a wave shape as illustrated at (c) upon insertion into the pulse forming circuit including capacitor 62, variable resistor 64 and thermistor resistance 34. The resultant pulse form is periodically introduced at the beginning of each half cycle to bilateral trigger 66. Should the voltage of pulse form (c) exceed the breakover voltage of trigger 66, thyristor 48 will be gated into conduction until current reversal at the terminus of the powering half cycle. The amplitude of each pulse of waveform (c) is directly influenced by the value of resistance present at thermistor 34. A low value of resistance at thermistor 34, corresponding to a high temperature measurement, will react to load down and thereby attenuate the voltage amplitude of each pulse. Should this amplitude fall below the breakover or threshold voltage of trigger 66, the trigger will not fire and no power will be inserted through thyristor 46 into heating element $R_{20}$. This status is depicted at the "power off" portion of the waveform illustrations.

Conversely, for the opposite situation where the measured temperature at thermistor 34 is low and its resistance is correspondingly higher, the amplitude of pulses (c) will be caused to rise to the breakover or threshold voltage of trigger 66. This status is depicted at the "power on" portion of the waveform illustrations. Note that as the breakover voltage is reached by the pulses of waveform (c) the thyristor 46 assumes a substantially fully conductive state. Should the breakover voltage not be reached, thyristor 46 does not conduct. As a consequence, the thyristor 46 will insert full power to heating element $R_{20}$ should gating voltage be reached by the time $t_2$ of each half cycle. It follows that the interval $t_1-t_2$, or $t'_1-t'_2$ for the opposite cycle, is in the nature of a sampling interval. If during this sampling interval pulse form (c) reaches a voltage of breakover or threshold amplitude, full conduction will ensue. On the other hand, if this peak voltage is repressed by a lower resistance at thermistor 34, the thyristor 46 will be rendered fully nonconductive. Resistor 64, being variable, also provides a convenient means for varying the heater temperature about which control is desired. This target temperature is typically termed an "operating point."

Figure 4:
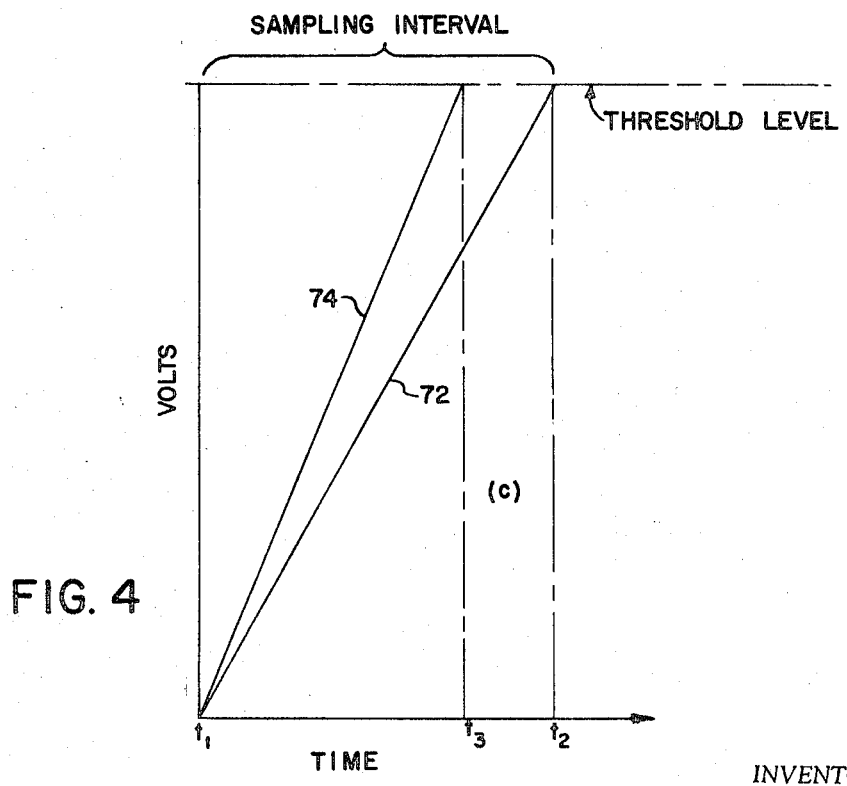
FIG. 4 is a highly magnified illustration of a portion of waveform (c) of FIG. 3.

Important features of the present invention lie in the functioning of the circuitry within the sampling intervals as at $t_1-t_2$ occurring periodically at the commencement of each half cycle. Only a relatively minor temperature and related resistance alteration at thermistor 34 will vary the amplitude of pulse forms (c) to an extent causing that reaction to trigger the phase controlling thyristor 46 into substantially full power of conduction. As a result, conventional thermistors may be used with the circuitry while it still enjoys a high sensitivity. Referring to FIG. 4, an idealized sampling interval $t_1-t_2$ is depicted in exaggerated scale. Should the amplitude of pulse form (c) substantially equal the threshold or breakover voltage of trigger 66, the forward slope of the pulse will reach the threshold level of trigger 66 at the time $t_2$. The forward slope of this pulse is depicted at 72. A very slight rise in resistance, for instance, corresponding to a thermal excursion within about 1° F., will increase pulse (c) amplitude to derive a higher slope as shown at 74. This greater slope will advance the triggering or phase position at thyristor 46 to a time shown at $t_3$, thereby permitting the insertion of slightly more power into heating element $R_{20}$. Accordingly, a proportional or phase control is effected within the sampling interval $t_1-t_2$ which acts as a highly responsive trim about the preselected target temperature.

Returning to FIG. 3, waveform (d) represents a wave trace of the power signal inserted into the heating element $R_{20}$. Inasmuch as thyristor 46 acts as a switch, the wave trace will assume the sinusoidal shape illustrated when in a "power off" status. Under substantially full conduction through thyristor 46, one side of the load $R_{20}$ will be interconnected to ground level line 42 to permit the passage of current. Under this status, a pulse waveform as illustrated within the "power on" portion of the diagram will be present.

The rapid response characteristic of the control circuit affords a versatile and effective heating station operation under a diversity of power supply levels. Under any supplied voltage level the circuitry permits an application of full power to the heating element whenever a threshold voltage is reached within the sampling. In addition to the advantageous rapid response rate and relative immunity from the detrimental effects otherwise caused by voltage variations, the control system may serve to anticipate temperature excursions by reacting to only minor temperature drops to insert full power into the heating station.

While a full wave source has been described in connection with the drawings, it will be apparent to those skilled in the art that any periodic, half-wave or cyclical form of power source may be used with the invention. Where a half-wave source is utilized as a line input, the full wave oriented components would be replaced by unilaterally acting devices. For instance, the thyristor 46 would be present as a silicon controlled rectifier, trigger 66 would be present as a Zener diode and diodes 50 and 52 would be present as a singular Zener diode.

In addition to its ideal simplicity, a further examination of the circuitry described above shows that the accurate and rapidly responsive control system operates without the use of amplification stages. This facet of the invention will be recognized as contributing to low cost production procedures.

The invention additionally has been shown to provide a novel association of a heating element which may be of a low mass variety having a relatively low thermal inertia with a corresponding highly sensitive control technique. This combination provides a desirous performance for a process heating station which must achieve target temperature levels or profiles within relatively short time intervals and under variable line input voltages. The combination also provides for a rapid accommodation of the quenching action often encountered at such heating stations.

Since certain changes may be made in the above system and apparatus without departing from the scope of the invention, it is intended that all matter contained in the above description or as shown in the accompanying drawings shall be interpreted as illustrative and not in a limiting sense.

I claim:

1. A system for controlling the thermal output of an electrical heating element comprising:
   a source of oscillating electrical power coupled with said heating element;
   gated switching means operative to conduct an electrical current between said power source and said heating element upon receipt of a forward biasing gating signal and to continue to conduct until said current is discontinued;
   sensor means responsive to the temperature of said heating element for providing an electrical characteristic representative of said temperature;
   signal generator means operative to provide an enabling signal output within an interval of restricted duration substantially near the commencement of each cycle of said power source said output having an amplitude alterable about a predetermined threshold level in response to the variable electrical characteristic of said sensor means; and
   triggering means responsive to the output of said signal generator means, coupled with said switching means gate and operable to cause its activation upon receipt of a said enabling signal during said restricted interval at said threshold value, whereby a substantial proportion of power available from said source is applied to said heating element when said triggering means is activated.

2. The control system of claim 1 wherein said signal generator means output threshold level is selected as the breakover signal level of said triggering means.

3. The control system of claim 1 wherein said sensor means comprises a nonlinear resistor means arranged in temperature sensing relationship with said heating element.

4. The control system of claim 3 wherein said sensor means is arranged in thermal bond with the heated environment of said heating element.

5. The control system of claim 3 in which said resistor means includes a negative temperature coefficient thermistor.

6. The control system of claim 1 in which said signal generator means is coupled in phase coincidence with said source of oscillating electrical power.

7. The control system of claim 1 wherein said signal generator means includes pulse forming means for restricting the duration of said interval at the commencement of each said power source cycle.

8. The control system of claim 1 in which:
   said power source provides alternating current power; and
   said switching means comprises gated full-wave control means connected between said power source and said heating element.

9. The control system of claim 20 in which:
   said triggering means is activated upon receipt of signals having values above a select breakover level; and
   said signal generator means threshold level is selected as the breakover signal level of said triggering means.

10. The control system of claim 9 in which said signal generator means includes signal clipping means for establishing the said amplitude threshold level of said enabling signal output.

11. The control system of claim 9 wherein said sensor means comprises a nonlinear resistor means arranged in temperature sensing relationship with said heating element.

12. The control system of claim 11 wherein said signal generator means includes pulse forming means for restricting the duration of said enabling signal output substantially within said interval at the commencement of each said power source cycle.

13. The control system of claim 11 wherein said sensor means is arranged in thermal bond with the heated element of said heating environment.

14. The control system of claim 11 in which:
   said signal generator means includes signal clipping means for establishing the said amplitude threshold level of said enabling signal output; and
   said signal generator means further includes pulse forming means for restricting the duration of said enabling signaling output substantially within said interval at the commencement of each said power source cycle.

15. The control system of claim 14 wherein said pulse forming means comprises an AC coupling circuit formed as a series connected capacitor means and resistor means.

16. The control system of claim 15 in which said coupling circuit resistor means is present as a variable resistor for adjusting the temperature operating level of said control system.

17. The control system of claim 16 in which said sensor means includes a negative temperature coefficient thermistor.

18. The control system of claim 17 including capacitor means coupled in parallel with said thermistor and responsive to the output of said enabling signal for buttressing current supply to said switching means upon each activation of said triggering means.

19. A system for controlling the thermal output of an electrical heating element comprising:
a source of alternating current electrical power coupled with said heating element;
switching means including gated full-wave control means connected between said power source and said heating element for conducting an electrical current between said power source and said heating element upon receipt of a forward biasing gating signal and operative to continue to conduct until said current is discontinued;
sensor means responsive to the temperature of said heating element for providing an electrical characteristic representative of said temperature;
signal generator means operative to provide an enabling signal output within an interval near the commencement of each cycle of said power source said output having an amplitude alterable about a predetermined threshold level in response to the variable electrical characteristic of said sensor means;
means for coupling said signal generator means in phase coincidence with said power source; and
triggering means responsive to the output of said signal generator means, coupled with said switching means gate and operable to cause its activation upon receipt of a said enabling signal at said threshold value.

20. A system for controlling the thermal output of an electrical heating element comprising:
a source of oscillating electrical power coupled with said heating element;
gated switching means operative to conduct an electrical current between said power source and said heating element upon receipt of a forward biasing gating signal and to continue to conduct until said current is discontinued;
sensor means responsive to the temperature of said heating element for providing an electrical characteristic representative of said temperature;
signal generator means coupled in phase coincidence with said source of electrical power for providing an enabling signal output within an interval near the commencement of each cycle of said power source said output having an amplitude alterable about a predetermined threshold level in response to the variable electrical characteristic of said sensor means and said signal generator means including signal clipping means for establishing the said threshold level; and
triggering means responsive to the output of said signal generator means, coupled with said switching means gate and operable to cause its activation upon receipt of a said enabling signal at said threshold value.